Nov. 14, 1944.    R. S. SANFORD    2,362,723
BRAKE MECHANISM
Filed April 24, 1943
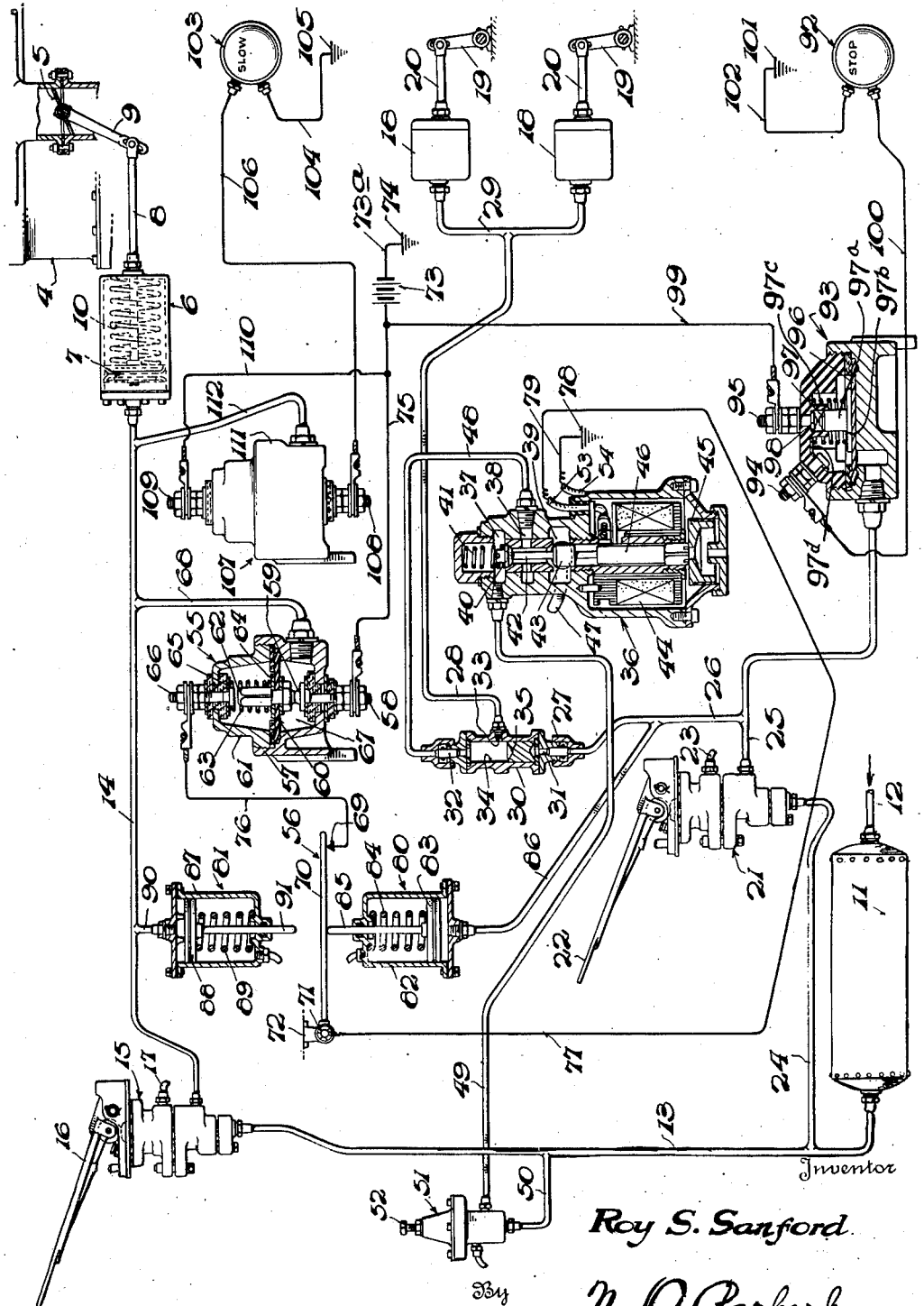
Inventor
Roy S. Sanford
By
N. D. Parker Jr.
Attorney Patented Nov. 14, 1944

2,362,723

UNITED STATES PATENT OFFICE 2,362,723

BRAKE MECHANISM

Roy S. Sanford, Woodbury, Conn., assignor to Bendix-Westinghouse Automotive Air Brake Company, Elyria, Ohio, a corporation of Delaware Application April 24, 1943, Serial No. 484,401

14 Claims. (Cl. 192—3)

This invention relates to control mechanisms for fluid motors, and more particularly to a system for controlling fluid pressure in a fluid motor adapted for the operation of vehicle brakes.

The invention further relates to the joint control of fluid pressure brakes by means of the regular brake control means as well as by means of the accelerator used for controlling the throttle of the vehicle engine. Systems of this type have previously been contemplated wherein the control of the brake mechanism was wholly or partially under the control of the vehicle accelerator in order to simplify the operation of the vehicle by the operator, but these systems have been inadequate in some cases to provide the coordinated control necessary to meet all vehicle operating conditions, and it is accordingly an object of the present invention to provide means for overcoming these disadvantages.

Another object of the invention is to provide means under the control of the accelerator for automatically effecting a partial application of the brakes when the accelerator is moved to release position.

Yet another object of the invention is to provide means for rendering the partial brake applying means ineffective when the brakes are applied in the regular manner subsequent to a partial application caused by release operation of the accelerator pedal.

Yet another object of the invention is to provide means under the control of the operator through the use of the regular vehicle controls for automatically effecting a partial application of the brakes on release of the accelerator under certain conditions of operation and for preventing such partial application of the brakes on release of the accelerator under other conditions of operation.

A further object of the invention is to provide auxiliary brake control means under the control of the operator for taking up the slack in the brake mechanism prior to application of the brakes by operation of the regular brake control pedal.

Still another object of the invention is to provide, in a system of the above type, means for indicating a partial application of the brakes to the operator of a following vehicle.

These and other objects of the invention will be more readily apparent when taken in connection with the accompanying drawing, wherein one form of the invention is illustrated. It is to be expressly understood, however, that the drawing is employed for purposes of illustration only, and is not designed as a definition of the limits of the invention, reference being had for this purpose to the appended claims.

In the drawing, the single view is a diagrammatic representation partially in section, of a fluid pressure brake and throttle control system constructed in accordance with the principles of the present invention.

Referring to the drawing, the invention is illustrated as including a vehicle engine 4 provided with a throttle valve 5 adapted to be actuated by means of a fluid motor 6 provided with a piston 7 adapted to be connected with the throttle valve through the medium of a piston rod 8 and a throttle lever 9, the throttle normally being held in closed position as shown through the medium of a spring 10, interposed between the casing of the motor 6 and the right end of the piston 7. A source of fluid pressure or reservoir 11 is supplied with fluid pressure through a conduit 12 from a suitable compressor, not shown, this reservoir being adapted to supply fluid pressure to the fluid motor 6 through conduits 13 and 14 under the control of a self-lapping valve mechanism 15 interposed therebetween, the self-lapping valve mechanism being preferably constructed in accordance with the principles set forth in the patent to Roy S. Sanford and William J. Andres, No. 2,133,275, issued October 18, 1938. The throttle control valve 15 is provided with an accelerator pedal 16 and an exhaust port 17, and it is to be understood that with the accelerator pedal in the position shown, the valve serves to prevent the flow of fluid pressure between conduits 13 and 14 and to permit the flow of fluid pressure between conduit 14 and the exhaust port 17, while on depression of the pedal, the valve acts to establish a connection between conduits 13 and 14 and to supply fluid pressure to the fluid motor 6 at a pressure proportional to the degree of depression of the accelerator pedal.

The fluid pressure brake system includes in general a pair of fluid pressure brake actuators 18 serving to operate brake levers 19 through the medium of connecting rods 20, the supply of fluid pressure to the brake actuators 18 being controlled through the medium of a brake valve 21, also constructed in accordance with the principles of the patent to Sanford and Andres, above referred to. It is to be understood that the brake valve is provided with a brake pedal 22 and with an exhaust port 23 as well as a supply conduit 24 connected to the reservoir 11 through conduit 13, as well as an outlet conduit 25. With the brake pedal 22 in the position shown, the valve is effective to prevent communication between conduits 24 and 25 and to permit communication between conduit 25 and the exhaust port 23 of the valve, depression of the pedal 22 serving to establish a connection between conduits 24 and 25 and to supply fluid pressure to the latter conduit at a pressure proportional to the degree of depression of the pedal. The conduit 25 is connected with the brake actuators 18 through a conduit 26, a double check valve 27, later to be described, a conduit 28 connected with the double check valve and a conduit 29 connected between the conduit 28 and the brake actuators 18. The double check valve is a well-known type being provided with a casing 30 provided at either end with ports 31 and 32 and provided with an outlet port 33 located in the wall of the casing intermediate the end. A bore 34 is provided in the interior of the casing, and a valve member 35 is slidably mounted in the bore and adapted when in the position shown to close the end of port 31, and when moved to the upper end of the bore 34 to close port 32. Thus on operation of the brake valve 21 to supply fluid pressure to the actuators 18, pressure is supplied to the port 31 of the double check valve through conduit 25 and conduit 26, forcing the valve member 35 to the upper end of the bore where it prevents the escape of fluid pressure through the port 32 and permits fluid pressure to flow to the actuators through the conduits 28 and 29. Thus under normal circumstances, the operator has complete control of the operation of the actuators 18 through the medium of the brake valve 21.

In many cases, particularly when driving in the open country on an express highway, it is desirable that the operator be permitted to check the speed of the vehicle slightly without necessitating the operation of the regular brake valve, and to this end mechanism is provided for effecting automatically, a partial application of the brakes through the application of fluid pressure to the actuators 18, comprising preferably an auxiliary brake valve 36 which may be of the electro-magnetic type and constructed in a manner similar to that illustrated in Fig. 2 of the patent to Arthur R. Leukhardt, No. 2,168,748, dated August 8, 1939. This valve is provided with an inlet chamber 37, an outlet chamber 38 and an exhaust chamber 39, together with an inlet valve 40 normally held in closed position by means of a spring 41 as shown, the valve being formed with a stem 42 provided at its lower end with an exhaust valve 43. An electro-magnet 44 is positioned in the valve mechanism for operation of an armature 45 having a connection with the inlet and exhaust valve 40, 43 through the medium of a slidably mounted stem 46, and it will be understood that with the parts in the position shown, the valve mechanism serves to prevent communication between the inlet and outlet chambers and serves to permit communication between the outlet chamber and the exhaust chamber 39, this latter chamber being connected with atmosphere through the medium of an exhaust conduit 47, while on energization of the electro-magnet, the armature 45 is moved upward, and by virtue of its connection with the valve through the stem 46, moves the exhaust valve to closed position and the inlet valve to open position to prevent communication between the outlet chamber 38 and atmosphere and to permit communication between the inlet chamber 37 and the outlet chamber 38. The outlet chamber 38 is connected with the port 32 of the double check valve 30 by means of a conduit 48, while the inlet chamber is connected with the reservoir 11 by means of a pair of conduits 49 and 50 connected with the conduit 13 leading to the reservoir, a feed valve mechanism 51 being interposed between conduits 50 and 49 for the purpose of supplying a pressure to the conduit 49 and to the electro-magnet valve less than that prevailing in the reservoir, as will be more fully explained hereinafter. The feed valve is of conventional type, being provided with an adjusting screw 52, and it will be understood that by changing the position of the adjusting screw, the valve may be adjusted to automatically supply and maintain any desired pressure from the reservoir to the conduit 49.

The electro-magnet 44 is provided with a pair of terminals 53 and 54, and energization of the circuit connected with these terminals is accomplished through the medium of serially connected switch mechanisms 55 and 56. The switch mechanism 55 is provided with a casing 57 provided at its lower end with an insulated terminal 58 having a contact 59 at its upper end. A flexible diaphragm 60 is clamped between the casing 57 and a cover member 61 threadedly received therein, the diaphragm carrying at its center a contact element 62 normally maintained in contact at its lower end with the contact 59 by means of a spring 63 interposed between a washer 64 clamped between the element 62 and the diaphragm 60 and a washer 65 associated with a terminal 66 and in electrical contact therewith, and carried by the cover member 61. The diaphragm 60 forms in conjunction with the casing member 57 a pressure chamber 67, this chamber being connected with the throttle control valve 15 through the medium of a conduit 68 connected with the conduit 14, the switch thus being of the pressure responsive type wherein the contacts are normally in a position to complete a circuit, the contacts being separated on the application of a predetermined pressure to the pressure chamber 67 sufficient to overcome the tension of the spring 63.

The switch mechanism 56 includes a contact 69, indicated diagrammatically, together with a switch bar 70 mounted at its left end on a friction hinge mechanism 71 carried by a bracket 72 mounted on the framework of the vehicle, the construction of the friction hinge mechanism being such that the switch arm 70 will remain at any given position due to the frictional action of the hinge until such time as it is moved to a different position by some applied force. The electrical circuit including these switches comprises a battery 73 having a connection 73a to ground on the vehicle at 74 and a connection 75 between the other pole of the battery and the terminal 58 of the switch 57. The terminal 66 of the switch 57 is in turn connected to the contact 69 by means of a connection 76, the left end of the switch bar 70 being connected with the terminal 53 of the magnet valve 36 by means of a connection 77, and the terminal 54 of the magnet valve being connected to ground at point 78 by means of a connection 79, current from the battery 73 thus flowing to the terminal 53 of the magnet valve when both the switches 56 and 57 are closed through connection 74, terminal 58, contacts 59 and 62, washer 64, spring 63, washer 65, terminal 66, connection 76, contact 59, switch arm 70 and connection 77.

Control of the switch arm 70 is affected by one or the other of a pair of fluid motors 80 and 81, the fluid motor 80 being provided with a cylinder 82 having a piston 83 slidably mounted therein and normally held in its lower position by means of a spring 84 interposed between the upper side of the piston and the upper end of the cylinder, the piston being provided with a piston rod 85, adapted on upward movement to move the switch arm 70 in a counter-clockwise direction about its friction hinge 71 to break the contact between the switch arm and the contact point 69. The fluid motor 80 is controlled by the operation of the brake valve 21, as will be more fully described hereinafter, the motor being connected to the outlet conduit 25 of the brake valve through the medium of conduit 26 and a conduit 86 which serves to connect the conduit 26 with the fluid motor. Thus on operation of the brake valve 21 to supply fluid pressure to the brake actuators 18, the piston and piston rod will be moved upward to break the contact between the arm 70 and the contact 69, and due to the operation of the friction hinge 71, the arm 70 will remain in this upward position until returned to the position shown in the drawing by other means. The fluid motor 81 likewise includes a cylinder 87 having a piston 88 slidably mounted therein and maintained in the position shown by means of a spring 89 interposed between the lower face of the piston and the lower end of the cylinder. The piston 88 is adapted to be subjected to the pressure delivered by the throttle control valve 15, the cylinder being connected to the throttle control valve through the medium of conduit 90 interconnected between the cylinder and the outlet conduit 14. Thus on operation of the throttle valve to supply fluid pressure to the fluid motor 6 to open the throttle on the engine, fluid pressure will be supplied to the motor 81 to move the piston, and a piston rod 91 connected thereto, downward to move the switch arm 70 in a clockwise direction and return it to the position shown in the drawing wherein contact is re-established between the arm and the contact 69.

There has thus been provided, in the structure hereinbefore described, a fluid pressure brake system controlled normally by a brake valve 21, and an auxiliary brake system wherein a magnet valve supplied with a reduced pressure from a feed valve 51 is adapted under certain conditions to supply fluid pressure to the brake actuators 18 independently of the operation of the brake valve 21, together with switch means controlled by the pressures in the fluid pressure brake system and in the fluid pressure throttle control system above described for controlling the energization of the auxiliary electro-magnetic brake valve. The parts are shown in normal position, and with the vehicle proceeding on the highway, it will be understood as heretofore described, that operation of the brake valve 21 will permit the operator to effect any desired degree of brake application, while operation of the throttle control valve 15 will allow the operator to control the supply of fluid pressure to the fluid motor 6 in order to provide any desired degree of throttle opening and consequently any desired vehicle speed. In the event the operator desires to slow down the vehicle without making a brake application, it will be apparent that on release of the accelerator pedal 16, the spring 63 in the switch mechanism 55 will force the contact 62 downward into engagement with the contact 59 thus completing the electrical circuit through the already closed switch 56 to energize the magnet valve 36 to establish a connection between conduits 49 and 48, the application of fluid pressure to the port 32 of the double check valve 30 through the conduit 48 serving to move the valve member 35 in downward direction, sealing off the port 31 and permitting the fluid pressure from the auxiliary brake valve 36 to flow to the actuators 18 through the double check valve, the outlet port 33 thereof, and conduits 28 and 29, and with the feed valve 51 properly adjusted to provide a pressure of 10 pounds, for example, at the inlet chamber of the electromagnetic brake valve, this pressure will be supplied to the actuators 18 with the result that the brake will be supplied with sufficient force to slightly check the speed of the vehicle without rendering it necessary for the operator to apply the brakes through the operation of the regular brake valve. When the operator releases the accelerator pedal to retard the speed of the vehicle in this manner, it will be seen that in the event it is unnecessary to further retard the speed of the vehicle, the operator may on subsequent depression of the accelerator pedal 16, immediately increase the speed of the vehicle again, the application of pressure to the fluid motor 6 through line 14 to speed up the engine serving to move the diaphragm 60 in the switch mechanism 55 upward to break the contact between the members 62 and 59, whereupon the magnet valve 36 will be de-energized and the fluid pressure in the brake actuators 18 will be exhausted to atmosphere through conduit 29, conduit 28, port 33 and double check valve 30, port 32, conduit 48, outlet chamber 38 and exhaust chamber 39 and exhaust conduit 47 of the magnet valve, thus permitting the vehicle to proceed with the brakes in fully released position.

If, on the other hand, it is found necessary to further check the speed of the vehicle, the operator has only to apply the brake by the operation of the pedal 22 of the brake valve 21 after release of the accelerator pedal, whereupon fluid pressure will be supplied to the lower end of the check valve 30, and thence to the brake actuators 18 as heretofore described. This will result in a further retardation of the vehicle speed, and in many cases, when the vehicle is so retarded, it is necessary for the operator to shift into a lower gear ratio, and during such a shift, it is undesirable to have the brakes applied as would be the case in the present system, were it not for the fact that means have been provided on application of the brakes in the normal manner, to break the contact at the switch 56 in order to render the auxiliary brake control system inoperative, and it is accordingly noted that under this type of operation, the fluid motor 80 is supplied with fluid pressure through the conduit 86 in such a manner as to move the switch arm 70 upward to open the circuit of the magnet valve, the friction hinge 71 serving to maintain this switch in open position until moved to closed position by the operation of the fluid motor 81. Thus, when a brake application has once been made by the regular control valve, the brake mechanism controlled by the throttle is rendered entirely ineffective, until subsequent operation of the accelerator to again increase the speed of the engine reconditions the auxiliary brake system for further automatic operation on release of the accelerator, it being noted that when the switch 56 has been opened, it can only be closed on application of fluid pressure to the throttle cylinder 6 by the operation of the valve 15, which in turn supplies fluid pressure to the motor 81 through the conduit 90 to move the piston 88 and the piston rod 91 downward to move the switch arm 70 to contact closing position, whereupon the system is in readiness for further automatic brake operation under the control of the accelerator pedal only. It is also pointed out that it may be desirable in some cases to so adjust the feed valve mechanism 51 as to supply pressure to the magnet valve 37 which will be just sufficient to overcome the friction in the actuators 18 as well as in the brake mechanism actuated by the levers 19, it having been found, that in many cases, a pressure of 5 or 6 pounds is necessary in the actuators in order to overcome this friction and move the brake shoes outward to a point where they are ready to contact the brake drums. With the valve 51 adjusted in this manner to deliver such a pressure to the auxiliary valve, it will be understood that whenever the accelerator pedal is moved to release position, sufficient pressure will be supplied to the brake actuators to overcome substantially all frictional resistance, thus conditioning the brakes for instantaneous application by the operation of the brake valve 21, and since this pressure can be supplied to the brake actuators during the period of time when the operator is moving his foot from the accelerator pedal to the brake pedal to apply the brakes, it will be clear that this arrangement will result in a considerable increase in the speed of brake application on operation of the brake pedal, and at high vehicle speeds, this additional speed of application may well result in a substantial decrease in the number of accidents had with vehicles so equipped.

In the system shown in the drawing, the vehicle is further equipped with a stop light 92 actuated by a stop light switch mechanism 93 which is preferably constructed as shown in Fig. 3 of the patent to Stephen Johnson, Jr., No. 1,925,762, dated September 5, 1933, it being understood that this switch is provided with a pair of terminals 94 and 95, as well as with mechanism actuated by means of a flexible diaphragm 96 which is effective when subjected to pressure on its lower side to close contacts 97 and 98 and establish an electrical connection between terminals 94 and 95, the casing of the switch being connected to the conduit 25 leading to the brake valve 21 and thus being subjected to the pressure delivered by the brake valve to the brake actuators at all times. The contact 98 is carried on the lower end of the terminal member 95, and the contact 97 is carried on the upper end of a metallic element 97a having flanged portion 97b resting on the upper side of the diaphragm. A spring 97c is interposed between the flanged portion and the upper end of the casing and makes contact at all times at its upper end with a metallic connector strip 97d which rests against the upper end of the housing and is connected at its left end to the inner end of the terminal member 94. Thus when the contacts 97 and 98 are in engagement, the circuit is completed between terminals 94 and 95 through the metallic strip 97d, the spring 97c, the flange 97b and the member 97a. The terminal 95 is connected to ground at 74 through the medium of a connection 99 connected to the wire 75 and thence to the battery 73, while the terminal 94 is connected to the stop light 92 by means of a wire 100, the stop light in turn being connected to ground at 101 by means of a wire 102. Thus on operation of the brake valve to apply the brakes the switch 93 is immediately effective to complete the electrical circuit through the stop light, whereupon the latter is lighted to give an indication to following vehicles that the brakes are being applied. It should be understood that the operation of this stop light is in no way dependent on the operation of the auxiliary brake controlling means.

In view of the fact that the above described mechanism includes means for effecting a complete brake application as well as separately controlled means for effecting a partial brake application, it is believed desirable to provide indicating means for indicating to following vehicles the action of the auxiliary brake mechanism, which would of course tend to slow down the vehicle and make it necessary for following vehicles to also make a brake application sufficient to effect a corresponding retardation, and to this end, an additional slow indicator light 103 is suitably mounted at the rear of the vehicle and provided with a wire 104 connected to ground at 105 and a second wire 106 having a connection with the terminal of the battery 73 through the medium of a switch mechanism 107, the switch mechanism being provided with a terminal 108 connected with the wire 106 and a second terminal 109 connected to the battery wire 75 by means of a connection 110. Thus we have a complete electrical circuit for the slow light 103 comprising the ground, the wire 104, the light 103, the wire 106, terminal 108 and switch mechanism 107, terminal 109, wire 110, wire 75, battery 73, and wire 73a leading to the ground 74. The switch mechanism 107 is preferably of the same construction as that of the switch mechanism 55, and accordingly is not shown in detail, it being understood from the description given in connection with the switch 55, that the switch 107 is a pressure responsive mechanism and that when there is no pressure in the mechanism, a connection is established between the terminals 108 and 109, while this connection is broken on the application of fluid pressure to the mechanism. This fluid pressure is supplied to a casing 111 of the switch mechanism through a conduit 112 having a connection with the conduit 14 connected to the outlet of the throttle control valve 15, and accordingly, on operation of the throttle control valve to supply fluid pressure to the fluid motor 6 to open the engine throttle, fluid pressure will also be supplied to the casing 111 of the switch 107 to break the connection between the terminals 108 and 109 and render the slow light 103 inoperative. On release of the accelerator pedal, however, fluid pressure is exhausted from the conduit 14, and an automatic partial application of the brakes is effected as hereinbefore described, and since the exhausting of pressure from the conduit 14 also results in an exhausting of pressure from the conduit 112 and the casing 111 of the switch 107, it will be apparent that the switch will be operative to establish a connection between terminals 108 and 109, thus completing the circuit through the slow light 103 and causing the latter to light to indicate to following vehicles that the operator is making a partial application of the brakes which will render it necessary for them to follow a similar course.

There has thus been provided by the present invention in conjunction with a brake system of more or less conventional type, auxiliary means for effecting a partial application of the brakes without special attention on the part of the operator, together with means for rendering the auxiliary brake applying apparatus ineffective under conditions which would make such a partial brake application undesirable, and in addition to the foregoing, means have also been provided for not only indicating when a normal application of the brakes is being made by the operator, but for also indicating when a partial application of the brakes is being made by the automatically operable mechanism, in order to permit the operators of following vehicles to take similar action in order to avoid the possibility of accident. This mechanism is controlled by two simple controls which are normally utilized by the operator in any case, one of these controls being the usual brake pedal and the other the accelerator pedal which controls the speed of the vehicle engine.

While the invention has been illustrated and described herein with considerable particularity, it is to be understood that the same is not limited to the forms shown but may receive a variety of mechanical expressions as will readily appear to those skilled in the art. Reference will, therefore, be had to the appended claims for a definition of the limits of the invention.

What is claimed is:

1. The combination in a motor vehicle having a fluid pressure brake system including a source of fluid pressure, a fluid motor for actuating the brakes, valvular means for controlling the application of fluid pressure to said motor, and a vehicle engine having a throttle and an accelerator for controlling the operation of said throttle for controlling the speed of the engine, of auxiliary means for controlling the application of fluid pressure to said fluid motor, and means controlled by the operation of said valvular means and said accelerator for controlling the operation of said auxiliary means.

2. The combination in a motor vehicle having an engine, a throttle, operator-controlled means for controlling the operation of said throttle, a fluid pressure braking system including a source of fluid pressure, a fluid motor for actuating the brakes, and operator-controlled means for controlling the application of fluid pressure to said motor, of auxiliary means for controlling the application of fluid pressure from said source to said fluid motor, means controlled by the operation of said first named operator-controlled means for rendering said auxiliary means operative to effect a partial brake application, and means controlled by the operation of said second named operator-controlled means in effecting a brake application to render said auxiliary means ineffective.

3. The combination in a motor vehicle having an engine, a throttle, operator-controlled means for controlling the operation of said throttle, a fluid pressure brake system comprising a source of fluid pressure, a fluid motor for actuating the brakes, and an operator-controlled valve for controlling the application of fluid pressure from said source to said motor, of auxiliary valvular means for supplying a reduced pressure from said source to said motor for effecting a partial brake application, means for rendering said auxiliary means operative to effect such partial brake application when the operator-controlled means and the operator-controlled valve are in released position, and means controlled by the operation of said valve to apply fluid pressure to said fluid motor for rendering said last named means ineffective.

4. The combination in a motor vehicle having an accelerator for controlling speed of the vehicle and a power operated brake system including a control element for applying the vehicle brakes, of auxiliary means for effecting a partial power application of the brakes, and means for rendering said auxiliary means operative to effect such a power application of the brakes when the accelerator is in release position and the control element is in release position and for rendering said auxiliary means ineffective to effect power operation of the brakes when the brakes are applied through the operation of the regular power operated brake system and control element.

5. The combination in a motor vehicle having an engine, a throttle, an accelerator for controlling the operation of said throttle, and a fluid pressure brake system including a source of fluid pressure, a fluid motor for actuating the brakes, and a brake valve for controlling the flow of fluid pressure from said source to said motor and for controlling the release of fluid pressure from said motor for controlling the application and release of the brakes, of auxiliary means including a magnet valve for establishing a connection between said source and motor for effecting a partial application of the brakes, means including a switch operable for energizing and de-energizing said magnet valve for applying and releasing the brakes, means for normally maintaining said switch in magnet valve energizing position, means operable on the application of fluid pressure to said motor by the operation of said brake valve for moving said switch to de-energizing position, and means controlled by movement of the accelerator to throttle opening position for returning said switch to magnet valve energizing position.

6. The combination in a motor vehicle having an engine provided with a throttle, an accelerator for controlling the operation of said throttle, brakes, and operator-controlled means for applying and releasing said brakes, of auxiliary means for applying and releasing the brakes, and means controlled by the operation of said accelerator and operator-controlled means for controlling the operation of said auxiliary means.

7. The combination in a motor vehicle having an engine provided with a throttle, an accelerator for controlling the throttle, vehicle brakes, and operator-controlled means for applying and releasing the brakes, of means operable on release of said accelerator for effecting a partial application of said brakes, and means operable on movement of said operator-controlled means to brake applying position for rendering said second named means ineffective.

8. The combination in a motor vehicle provided with an engine having a throttle, an accelerator for controlling the operation of the throttle, a brake actuator, operator-controlled means for controlling the operation of said actuator to apply and release the brakes, and means controlled by the operation of said accelerator for controlling the operation of said actuator for effecting a partial application of the brakes, of means including an indicator light controlled by the operator-controlled means for indicating an application of the brakes thereby, and a second indicator light controlled by the operation of said accelerator for indicating a partial application of the brakes.

9. The combination in a motor vehicle having a fluid pressure brake system including a source of fluid pressure, a fluid motor for actuating the brakes, valvular means for controlling the application of fluid pressure to said motor, and a vehicle engine having a throttle and an accelerator for controlling the operation of said throttle for controlling the speed of the engine, of means operable on release of said accelerator for supplying fluid pressure from said source to said motor and effecting an application of the brakes, and means operable on operation of said valvular means for supplying fluid pressure to said motor for preventing an application of the brakes by the operation of said second named means.

10. The combination in a motor vehicle having an engine provided with a throttle valve, an accelerator for controlling the operation of said valve, vehicle brakes, a brake pedal for controlling the application of the brakes, and means controlled by the accelerator for controlling the application of the brakes, of means controlled by the operation of said pedal to apply the brakes for rendering the accelerator controlled means ineffective to apply the brakes, and means controlled by the operation of said accelerator to increase the speed of the engine for conditioning the accelerator-controlled means to apply the brakes when the accelerator is subsequently moved to release position.

11. The combination in a motor vehicle having an engine, a throttle, an accelerator for controlling the operation of said throttle, and a fluid pressure brake system including a source of fluid pressure, a fluid motor for actuating the brakes, and a brake valve for controlling the flow of fluid pressure from said source to said motor, of auxiliary means including a magnet valve for supplying fluid pressure from said source to said motor, and means for controlling the energization of said magnet valve including a pair of serially connected switches, means operated by the accelerator for controlling the operation of one of said switches, and means operated by the accelerator and brake valve for controlling the other switch.

12. The combination in a motor vehicle having an engine provided with a throttle, brakes, a fluid motor for operating said throttle, a fluid actuator for operating said brakes, valvular means for controlling the pressure of fluid in said motor, and a brake valve for controlling the pressure in said actuator, of auxiliary means for controlling said brakes including a magnet valve for supplying a limited pressure to said actuator, means including a pair of serially connected switches for controlling the energization of said magnet valve, means responsive to the pressure in said motor for controlling one of said switches, and means responsive to the pressure in said motor and the pressure in said actuator for controlling the other switch.

13. Auxiliary control mechanism for controlling the operation of the brakes on a vehicle of the type having a fluid pressure brake system including a source of fluid pressure, a fluid motor for actuating the brakes, valvular means for controlling the application of fluid pressure to said motor, and a vehicle engine having a throttle and an accelerator for controlling the operation of said throttle for controlling the speed of said engine, said auxiliary controlling means including a device for controlling the flow of fluid pressure from the source to the motor and means controlled by the operation of said valvular means and by the operation of said accelerator for controlling the operation of said device.

14. Auxiliary control means for controlling the operation of the brakes on a vehicle of the type having engine controlling means including a throttle and an accelerator for controlling the operation of said throttle, and a fluid pressure brake system including a source of fluid pressure, a fluid motor for actuating the brakes, and a brake valve for controlling the flow of fluid pressure from said source to said motor, said auxiliary control means including a magnet valve for supplying pressure from the source to the motor, and means for controlling the energization of said magnet valve including a pair of serially connected switches, means operated by the accelerator for controlling the operation of one of said switches, and means controlled by the accelerator and brake valve for controlling the other switch.

ROY S. SANFORD.